United States Patent Office 3,353,800
Patented Nov. 21, 1967

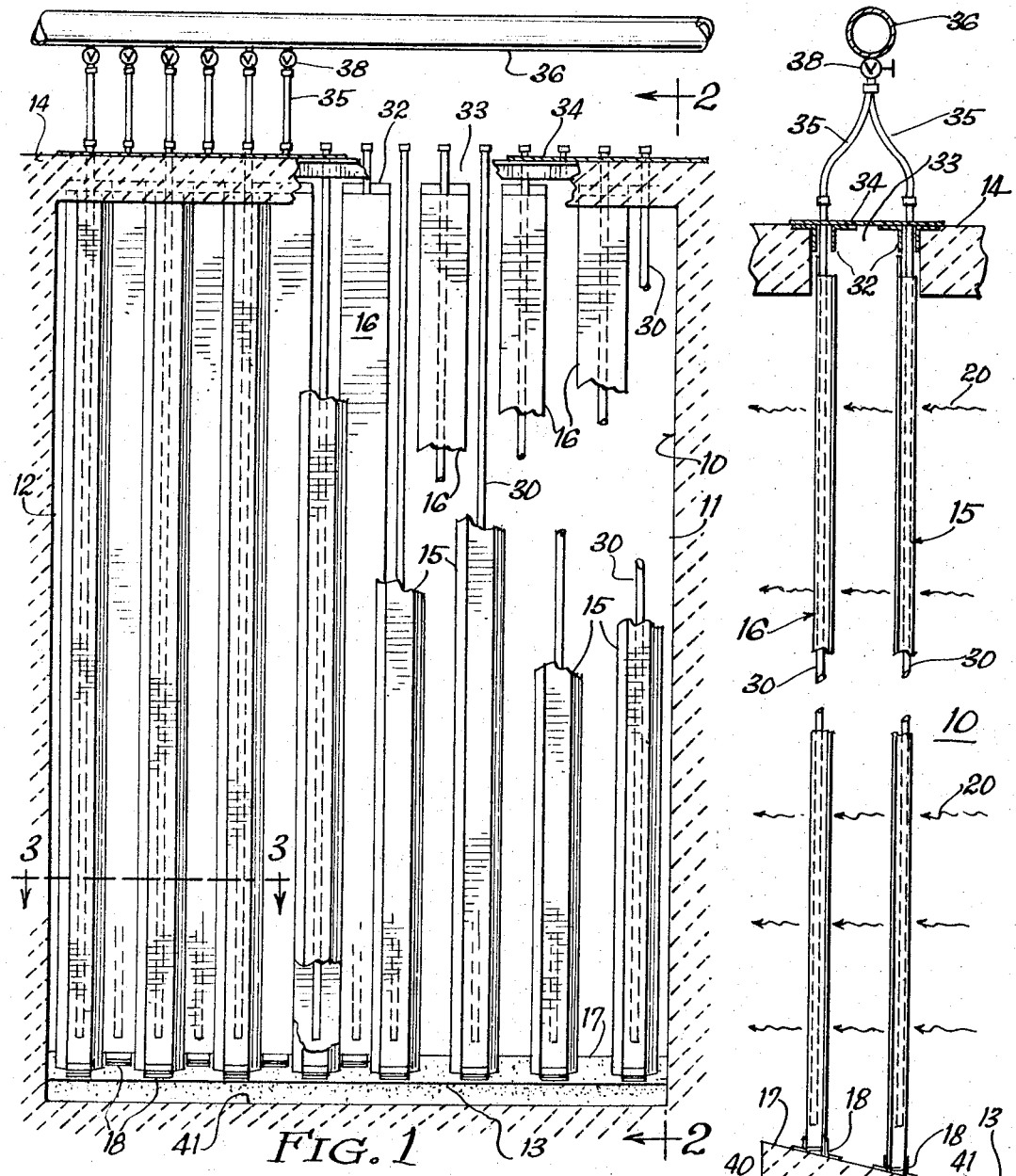

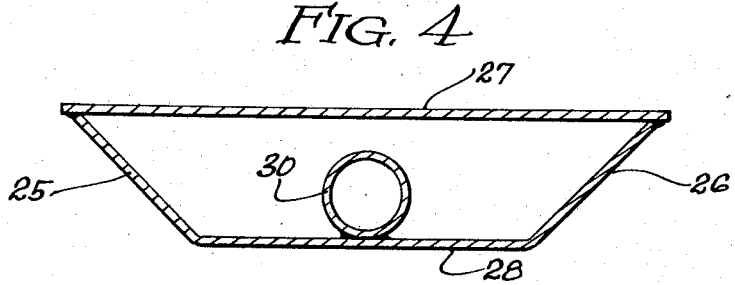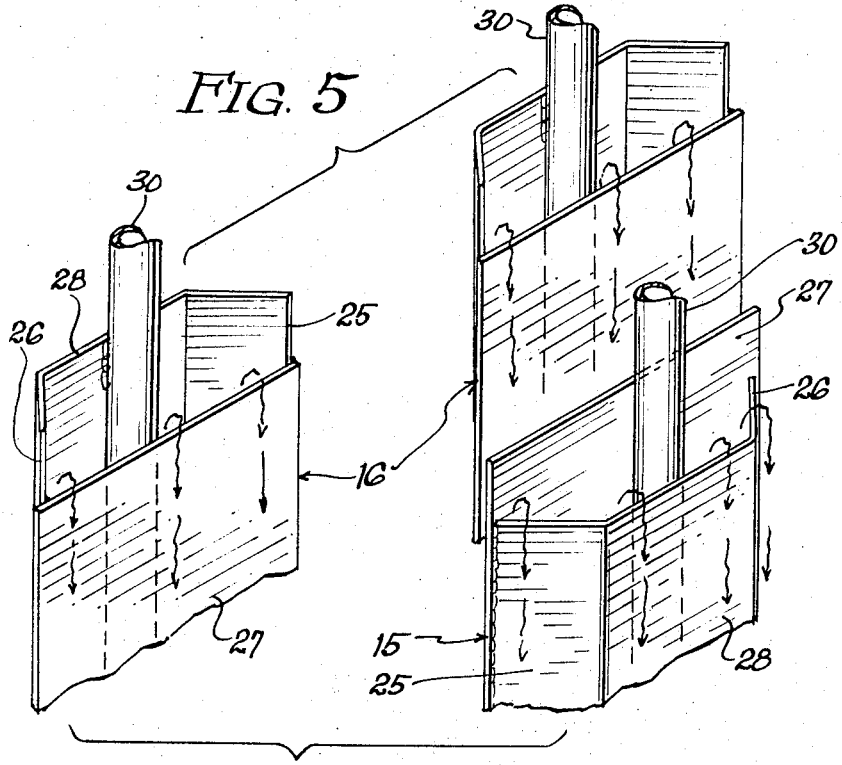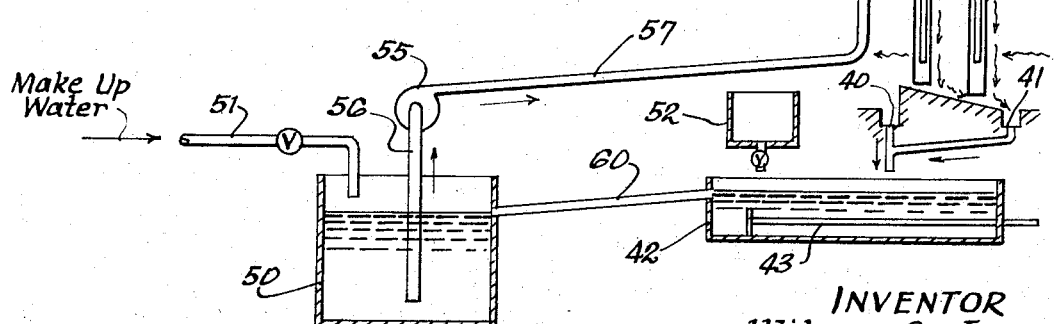

3,353,800
APPARATUS FOR REMOVING SOLIDS FROM HOT GASES
Wilmer C. Jens, Milwaukee, Wis., assignor to M. H. Detrick Company, Chicago, Ill., a corporation of Delaware
Filed Jan. 11, 1965, Ser. No. 424,589
7 Claims. (Cl. 261—3)

ABSTRACT OF THE DISCLOSURE

Apparatus for removing solids from hot gases comprising a plurality of vertically disposed elongated tanks, the tanks arranged in spaced relation with each other in two spaced rows extending transversely to the flow direction of the hot gases. The tanks are trapezoidal in horizontal cross section, and at least those in the upstream row have the narrower of the parallel walls and the converging walls facing upstream. The tanks in one row are staggered with respect to the tanks in the other row. The upstream walls of the tanks have upper edges at lower elevation than the upper edges of the downstream walls. Water is continuously supplied to the tanks, whereby the tanks overflow and water flows downwardly on the outside of those walls facing upstream. The water supply means includes a settling tank, means directing overflow water and trapped solids to the settling tank, means supplying alkaline material to the settling tank, a supply tank receiving water from the settling tank, means adding make-up water to the supply tank and means delivering water from said supply tank to the plurality of elongated tanks.

---

This invention relates to apparatus for removing solids from hot gases of combustion.

The apparatus of this invention has been designed particularly to remove fly ash and the like from gases generated in commercial incinerators, but it will find use in other furnaces wherein the products of combustion contain excessive amounts of solid material.

In brief, apparatus of this character utilizes running water that flows downwardly by gravity on the exterior surfaces of spaced elements disposed across the travel path of the gas. Solids entrained in the gas impinge against and are trapped by the flowing water, thereby rendering the gas sufficiently free of solids to be discharged to atmosphere.

One object of the invention is to provide effective and economical apparatus of this character that employs screens of running water against which the hot gases impinge. The screens consist of water flowing downwardly on the exterior of at least the upstream walls of a plurality of spaced tanks of specific horizontal cross section arranged in staggered rows extending generally transversely to the flow direction of the gas.

Another object is to provide apparatus as above described wherein failure of the water supply will not result in damage to the apparatus by reason of the high temperature of the gases and the absence of the water as a cooling medium. The tanks, during operation, are supplied continuously and filled with water which overflows at the tank tops and flows downwardly on the outside of at least those tank walls facing the upstream direction of gas flow. If the water supply fails, damage to the apparatus is not likely until evaporation of all or most of the water in the tanks, providing a time period of from one-half hour to one hour within which to correct the water failure or reduce the flow of gas.

Another object is to provide such apparatus wherein the individual tanks have walls that are lower in elevation at the tops on the upstream side than on the downstream side, whereby overflow occurs only on the upstream walls, thereby minimizing the amount of water required to operate the apparatus.

Still another object of the invention is to provide apparatus wherein the water supply system for the tanks includes a vertical pipe in each tank terminating at its lower end adjacent the tank bottom. With this arrangement there is water circulation throughout each tank which avoids objectionable accumulation of sediment in the lower portion of the tank.

Another object contemplates apparatus of the above character that includes a settling tank for removal of some or all of the solids trapped by the water.

Still another object is to provide apparatus wherein the water used to trap the solids is recirculated into the water screen tanks after flowing through the settling tank. New make-up water, of course, is added to compensate for water lost by evaporation or for other reasons.

When the hot gases impart an acidic characteristic to the water, as they usually do, the invention contemplates the addition of an alkali, such as soda ash, into the recirculating water. An excess of alkali is recommended so that the water in the settling tank has an alkaline and thus soapy characteritsic. Where the invention is used in incinerators, the hot soapy water constitutes a highly satisfactory washing fluid for garbage trucks.

Other objects, advantages and details of the invention will be apparent as the description proceeds, reference being had to the accompanying drawings wherein one form of apparatus embodying the invention is shown. It will be understood, however, that the description and drawings are illustrative only and that the scope of the invention is to be measured by the appended claims.

In the drawings:

FIG. 1 is an elevational view, partly broken away, of apparatus embodying the invention, the view looking from the upstream side.

FIG. 2 is an enlarged sectional view on line 2—2 of FIG. 1.

FIG. 3 is a fragmentary enlarged sectional view on line 3—3 of FIG. 1.

FIG. 4 is an enlarged transverse sectional view of one of the water screen tanks used in the invention.

FIG. 5 is a composite perspective view of the upper portions of one water screen tank in the upstream row and two tanks in the downstream row.

FIG. 6 is a schematic diagram illustrating the system using the apparatus of the invention.

Referring to FIGS. 1–3, a flue or passageway for the hot gases of combustion from an incinerator or other furnace is designated 10. Passageway 10 is defined by refractory side walls diagrammatically shown at 11 and 12, floor 13 and roof 14. Passageway 10 extends between a combustion chamber (not shown) and a stack or the like.

A plurality of vertically disposed elongated tanks 15 and 16 extend from an inclined threshold 17 (FIG. 2) on floor 13 to an upper termination adjacent roof 14.

Tanks 15 and 16 are retained in position at the bottom by means such as angle irons 18 secured to threshold 17.

Tanks 15 and 16 are arranged in spaced relation with each other in two spaced rows extending transversely of the flow direction of the hot gases. The flow direction is indicated by the arrows 20 in FIGS. 2 and 3. Tanks 15 are shown located in the upstream row, and tanks 16 in the downstream row. The tanks in one row are staggered with respect to the tanks in the other row, as shown in FIGS. 1 and 3.

For maximum effectiveness the lateral edges of the tanks in one row slightly overlap the lateral edges of the tanks in the other row, referred to the flow direction of the gases, as best shown in FIG. 1, whereby the tanks appear to present a solid wall to the flowing gases. This wall, of course, permits gas flow therethrough by reason of the spacing between the two rows of spaced tanks (FIGS. 2 and 3).

Each of the tanks 15 and 16 is trapezoidal in horizontal cross section as shown in FIGS. 3 and 4. The opposed non-parallel walls 25 and 26 converge toward each other from the wider of the two parallel walls, namely wall 27, and make angles of about 45 degrees with wall 27. As shown, non-parallel walls 25 and 26 are integral with narrower parallel wall 28.

Each of the vertical tanks 15 and 16 includes a pipe 30 that extends longitudinally of the tank. As shown, pipe 30 is welded or otherwise suitably secured to one of the tank walls, for example narrower parallel wall 28.

The lower end of each pipe 30 terminates adjacent a tank bottom (FIGS. 1 and 2). As will be seen, water is fed continuously to the interior of tanks 15 and 16 through pipes 30, and the location of the lower pipe ends adjacent the tank bottoms insures a flow of water throughout the tanks. This prevents the formation of objectionable deposits of sediment in the tank bottoms, and avoids conditions leading to harmful hot spots in the apparatus.

The upper ends of pipes 30 extend beyond the upper edges of the tanks 15 and 16, and, in the form of the invention shown, serve to engage suitable structure in furnace roof 14 and thus hold tanks 15 and 16 in properly spaced upright position. Suitable members such as metal channels or angle irons 32 are mounted in a transverse opening 33 in roof 14, and they in turn connect with the upper end portions of pipes 30. Roof opening 33 is closed by a suitable cover plate 34 to prevent the escape of hot gases.

The upper ends of the several pipes 30 are connected by means of curved pipes 35 to a manifold supply pipe 36. Individual valves 38 are shown at the connections between curved pipes 35 and manifold pipe 36.

As will be seen, during operation of the apparatus water is supplied continuously in proper amount to manifold pipe 36 under comparatively low pressure. The water flows through valves 38, curved pipes 35 and pipes 30 into the bottoms of tanks 15 and 16, filling the tanks to overflowing. The water flows downwardly by gravity on the exterior of some or all of the tank walls, and is engaged by the hot gases travelling through flue or passageway 10.

Floor 13 has run-off gutters 40 and 41 (FIG. 2) that receive the overflow water and trapped solids and direct same to a settling tank 42 (FIG. 6). A drag line 43 or the like in tank 32 facilitates periodic removal of the solid material deposited by the water.

Referring to FIG. 5, tanks 15 and 16 possess structural differences, as will be seen, and they are oriented reversely in the illustrated two rows.

As mentioned, tanks 15 are located in the upstream row, that is, the row first encountered by the travelling hot gases. Tanks 15 are oriented with narrower parallel walls 28 facing upstream. With this orientation, non-parallel walls 25 and 26 also face upstream, generally speaking, and wider parallel walls 27 face downstream. As shown in FIG. 5, the upper edges of walls 25, 26 and 28 of tanks 15 have lower elevation by a small amount than the upper edges of downstream walls 27. With this arrangement, the overflow and exterior downward flow from tanks 15 occur only on walls 25, 26 and 28, as indicated by arrows 45.

Reversely oriented tanks 16 in the downstream row have wider parallel walls 27 facing in upstream direction. The upper edges of walls 27 of tanks 16 are at lower elevation than the upper edges of downstream walls 25, 26 and 28, whereby overflow and exterior downward flow only occur on walls 27 as indicated by arrows 47.

With the upper edges of tanks 15 and 16 constructed as above described, water flow is confined to the upstream walls, thereby minimizing the amount of water used and contributing to economy.

Referring to FIG. 6, a complete system using the apparatus is shown diagrammatically. A supply tank 50 receives previously used water from settling tank 42 and fresh make-up water from a source 51. In instances where the hot gases impart an acidic characteristic to the water, an alkaline material such as soda ash is added from a source such as tank 52.

A motor-pump 55 delivers water at relatively low pressure from supply tank 50 through pipes 56 and 57 to the header or manifold supply pipe 36, whence it is directed through curved pipes 35 to the individual pipes 30 within the respective tanks 15 and 16. As previously mentioned, the water completely fills tanks 15 and 16, and overflows at the top edges of the tanks. The water flows downwardly by gravity on the exterior surfaces of at least the upstream tank walls where it is engaged by the travelling hot gases in passageway 10. Most of the solids and various soluble components contained in the gases are trapped and dissolved in the flowing water and with the water are received in gutters 40 and 41 leading to settling tank 42. Used water from tank 42 returns to supply tank 50 through pipe 60.

In a typical installation where the hot gases have a temperature of about 1800° F. on the entering side of the water screen, the temperature may drop to about 650° F. on the exit side. As a consequence, the evaporation rate is comparatively high, and in the installation observed about 30% of the water fed to the tanks is lost by evaporation. A corresponding amount of make-up water, of course, is added to the system from source 51.

After several cycles from start-up, the water in settling tank 42 of the observed installation assumes an equilibrium temperature of about 140° F. When a slight excess of alkaline material such as soda ash is introduced, the water at this temperature has a soapy characteristic and is an ideal fluid for washing garbage trucks, for example.

It will be noted that the present apparatus does not employ spray nozzles in connection with the water screen. This is an advantage, as nozzles tend to become plugged by solids from the gases and by corrosion.

The apparatus of the invention provides a significant safety factor against the failure of the water supply system. As mentioned, damage to the tanks is not likely until evaporation of most, if not all, of the water contained in the tanks. The time required for evaporation affords opportunity to correct the water supply difficulty, or reduce the flow of hot gases.

The arrangement of the spaced tanks in at least two spaced rows with the tanks in overlapping staggered relation insures that virtually all of the hot gas will engage the flowing water. The cross sectional shape and the spacing of the tanks are such that the flow resistance to the gas is held to a satisfactory level. In other words, the apparatus does not cause an objectionable back pressure that unduly impedes the gas flow.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. Apparatus for removing solids from hot gases comprising:
   a plurality of vertically disposed elongated tanks, each tank trapezoidal in horizontal cross section, the opposed non-parallel walls converging toward each other from the wider of the two parallel walls at angles of about 45° with said wider parallel wall;
   said tanks arranged in spaced relation with each other in two spaced rows extending transversely to the flow direction of the hot gases, the tanks in the upstream row having the narrower of the parallel walls and the converging walls facing upstream and the tanks in the downstream row having the wider of the parallel walls facing upstream, the tanks in one row staggered with respect to the tanks in the other row; and means providing a continuous supply of water to said tanks, whereby water overflows and flows downwardly on the outside of at least those walls facing upstream.

2. The combination of claim 1 wherein the upstream walls of said tanks are lower at the tops than the downstream walls, whereby overflow occurs only on the upstream walls.

3. The combination of claim 1 wherein the lateral edges of said tanks in one row overlap the lateral edges of the staggered tanks in the other row.

4. The combination of claim 1 wherein said means providing a continuous supply of water to said tanks includes a vertical pipe in each tank terminating at its lower end adjacent the tank bottom.

5. The combination of claim 1 wherein said means providing a continuous supply of water to said tanks includes a settling tank, means directing overflow water and trapped solids to said settling tank, a supply tank, means conducting water from said settling tank to said supply tank, means adding make-up water to said supply tank and means delivering water from said supply tank to said plurality of elongated tanks.

6. The combination of claim 5 with the addition of means supplying alkaline material to said settling tank.

7. Apparatus for removing solids from hot gases comprising:

a plurality of vertically disposed elongated tanks, each tank trapezoidal in horizontal cross section, the opposed non-parallel walls converging toward each other from the wider of the two parallel walls at angles of about 45° with said wider parallel wall;

said tanks arranged in spaced relation with each other in two spaced rows extending transversely to the flow direction of the hot gases, the tanks in at least the upstream row having the narrower of the parallel walls and the converging walls facing upstream, the tanks in one row staggered with respect to the tanks in the other row, each upstream wall of each tank having an upper edge at lower elevation than the upper edge of any downstream wall of such tank; and means providing a continuous supply of water to said tanks, whereby water overflows and flows downwardly on the outside of those walls facing upstream.

References Cited

UNITED STATES PATENTS

| | | | |
|---|---|---|---|
| 139,665 | 6/1873 | Frazier | 261—109 X |
| 511,424 | 12/1893 | Hinz | 261—119 X |
| 684,217 | 10/1901 | Gardner et al. | |
| 1,749,920 | 3/1930 | Modave | 261—111 |
| 1,866,193 | 7/1932 | Coutant | 261—112 X |
| 1,989,773 | 2/1935 | Snow | 261—112 X |
| 2,278,778 | 4/1942 | Grossmann et al. | 261—112 |
| 2,583,390 | 1/1952 | Paasche | 261—112 X |
| 2,622,857 | 12/1952 | Vicard | 261—112 X |

FOREIGN PATENTS

| | | |
|---|---|---|
| 7,209 | 5/1900 | Great Britain. |

HARRY B. THORNTON, *Primary Examiner.*

TIM R. MILES, *Examiner.*